Figure 1:
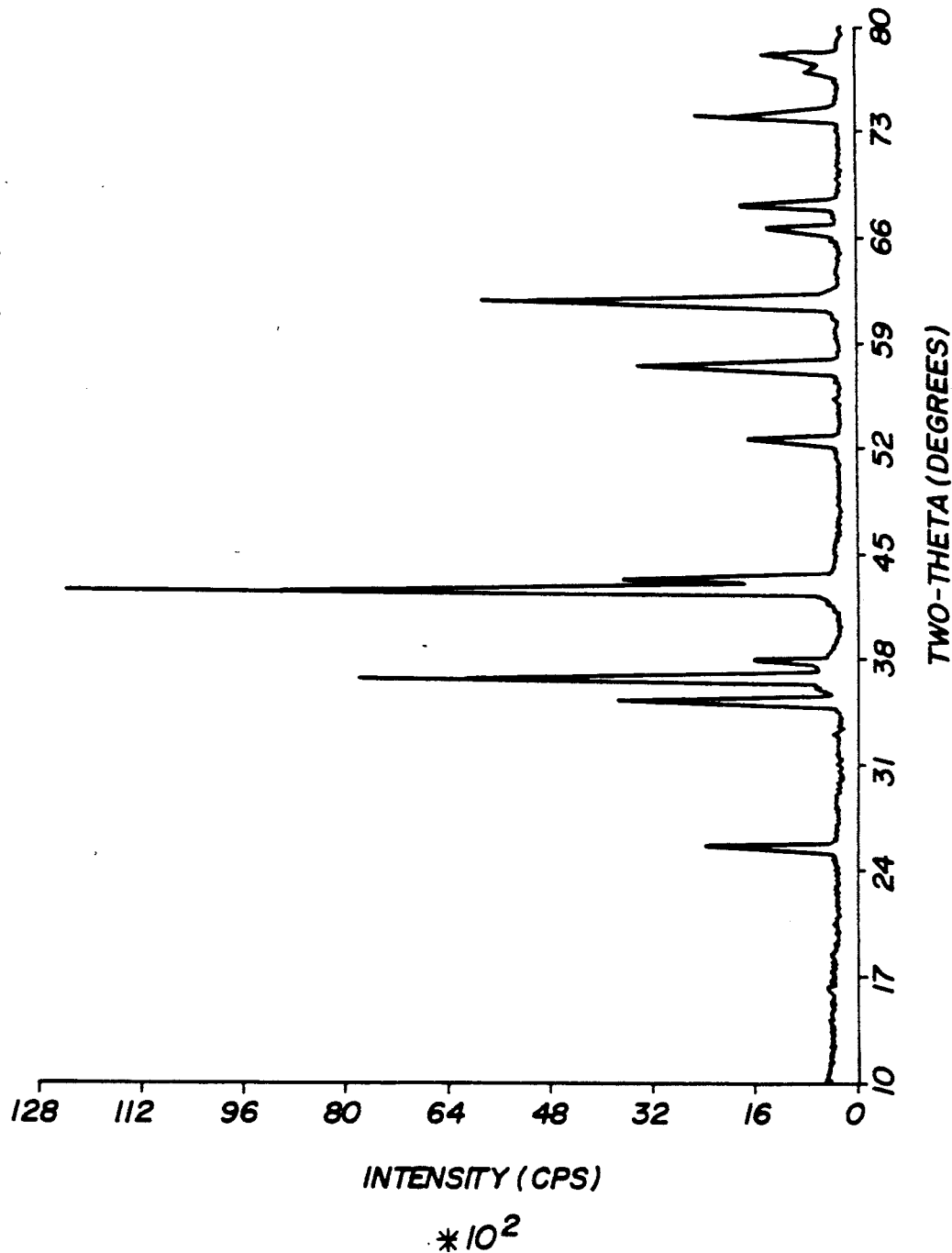

United States Patent [19]

Giunchi et al.

[11] Patent Number: 5,068,211

[45] Date of Patent: Nov. 26, 1991

[54] REFRACTORY AND ELECTROCONDUCTIVE CERAMIC COMPOSITIONS AND PROCESS FOR THE PREPARATION THEREOF

[75] Inventors: Giovanni Giunchi, Novara, Italy; Ender Savrun, Tucson, Ariz.; Alberto Grenni, Segrate Milan, Italy; Ching-Fong Chen, Tucson, Ariz.

[73] Assignee: Kerag31m3o4nt Italia S.p.A., Milan, Italy

[21] Appl. No.: 656,770

[22] Filed: Feb. 15, 1991

[30] Foreign Application Priority Data

Feb. 19, 1990 [IT] Italy ................................ 19409 A/90

[51] Int. Cl.$^5$ ................................................ C04B 35/58
[52] U.S. Cl. ........................................ 501/98; 501/96; 501/127; 501/153
[58] Field of Search .................. 501/96, 98, 127, 153

[56] References Cited

U.S. PATENT DOCUMENTS

| | | | |
|---|---|---|---|
| 4,518,398 | 5/1985 | Tanaka et al. | 51/309 |
| 4,526,875 | 7/1985 | Yamamoto et al. | 501/87 |
| 4,528,121 | 7/1985 | Matsushita et al. | 252/516 |
| 4,605,633 | 8/1986 | De Angelis | 501/87 |
| 4,605,634 | 8/1986 | De Angelis | 501/96 |
| 4,788,167 | 11/1988 | Mathers et al. | 501/98 |
| 4,855,264 | 8/1989 | Mathers et al. | 501/98 |
| 4,957,886 | 9/1990 | Mathers et al. | 501/96 |

*Primary Examiner*—William R. Dixon, Jr.
*Assistant Examiner*—Chris Gallo
*Attorney, Agent, or Firm*—Stevens, Davis, Miller & Mosher

[57] ABSTRACT

Refractory and electroconductive ceramic compositions having a density higher than 4 g/cm$^3$, ultimate tensile strength higher than 250 MPa, Vickers microhardness higher than 1000 kg/mm$^2$ and electric resistivity lower than 600 microohm.cm, essentially consisting of alumina and of a nitride component of at least one transition metal belonging to groups IVB, VB or VIB of the Periodic Chart of the Elements.

21 Claims, 4 Drawing Sheets

REFRACTORY AND ELECTROCONDUCTIVE CERAMIC COMPOSITIONS AND PROCESS FOR THE PREPARATION THEREOF

FIELD OF THE INVENTION

The present invention relates to electroconductive ceramic compositions and to the process for the preparation thereof.

BACKGROUND OF THE INVENTION

It is known, as published in "Journal of Materials Science" 20 (1985), page 3697, in "Ceramics International" 15 (1989), page 271 or in "Journal of Material Science" 16(1981), 2997, that at high temperatures, reactions of the type

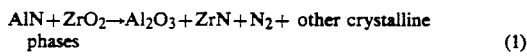
$$AlN + ZrO_2 \rightarrow Al_2O_3 + ZrN + N_2 + \text{other crystalline phases} \quad (1)$$

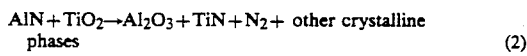
$$AlN + TiO_2 \rightarrow Al_2O_3 + TiN + N_2 + \text{other crystalline phases} \quad (2)$$

may take place. In these above reactions, by the term "other crystalline phases" suboxides or oxynitrides, in different valency state of the corresponding metals, are intended.

It is also known that materials of the type of metal nitrides, such as for instance zirconium or titanium nitride, are good electroconductive materials and have hardness and tribologic characteristics such to be used in ceramic composite materials useful as anti-wear materials, for instance in coatings or inserts for cutting tools.

To this purpose powders of metal nitrides and alumina having suitable granulometries, can be mixed intimately and sintered at high temperature and under pressure or can be deposited on the material surfaces by techniques such as "physical vapor deposition".

On the contrary, ceramic compositions obtained by reactions (1) and (2) are not suitable for practical uses in that they have reduced mechanical and electrical characteristics and low stability and/or controllability.

The applicants have now found that if reactions of the type (1) and (2) are carried out under suitable process conditions, it is possible to obtain compositions, essentially consisting of alumina and metal nitrides, with high density and exhibiting homogeneous and isotropic scattering of components.

The thus obtained compositions are suitable for practical applications in that they are endowed with mechanical and tribologic properties higher than those of analogous compositions obtained by the above mentioned conventional sintering processes and can be worked by spark erosion techniques.

DESCRIPTION OF THE INVENTION

Therefore, it is an object of the present invention to provide refractory and electroconductive compositions obtained by reactive sintering of aluminium nitride with at least one oxide of a transition metal, selected among those belonging to groups IVB, VB and VIB of the Periodic Chart of the Elements, at a temperature higher than 1450° C. and under a pressure higher or equal to 10 MPa.

At the end of the reactive sintering, the ceramic composition of the present invention essentially consists of an oxidic component, essentially represented by alumina, and of a nitride component, essentially represented by at least one nitride of at least one transition metal of groups IVB, VB and VIB.

Among the ceramic compositions of the present invention those having an oxide component content comprised between 20 and 80% by weight (b.w.) generally between 40 and 60%, and a nitride component content comprised between 80 and 20% b.w., generally between 60 and 40% are preferred.

The compositions wherein the nitride component contains one, two or three nitrides of one, two or three transition metals are included in the present invention.

Transition metals used in ceramic compositions of the present invention are those belonging to groups IVB, VB and VIB of the Periodic Chart of the Elements; with preferred metals being titanium, zirconium, hafnium, vanadium, niobium and tantalum.

Ceramic compositions of the present invention are highly refractory in that they have melting temperatures equal to or higher than 2000° C., generally between 2000° and 2500° C., and are characterized by a continuous nitride phase which makes them highly electroconductive at room temperatures; they may be endowed with superconductive properties at temperatures higher than the hydrogen liquefaction temperature.

The present ceramic compositions have a density higher than or equal to 4 g/cm$^3$, generally between 4 and 10 g/cm$^3$, a densification higher than 90%, generally between 95 and 99,9%, an ultimate tensile strength, measured according to U.S. Military Standard 1942 (MR), higher than 250 MPa, generally between 300 and 600 MPa, Vickers micro-hardness, measured according to ASTM E-384 higher than 1000 kg/mm$^2$, generally comprised between 1200 and 2500 kg/mm$^2$ and electric resistivity, measured according to ASTM F-43, lower than 600 microohm.cm, generally between 400 and 100 microohm.cm.

Ceramic compositions of the present invention can be used in thermotechnique environments as resistors for furnaces, crucibles for the evaporation of metals, etc., in mechanical processing as materials for tools, in mechanical components as anti-wear and antistatic materials, in the aerospace environment as coating for space apparatus, etc. or as shaped bodies.

A process for the preparation of the refractory and electroconductive ceramic compositions here described the steps of:

(a) mixing aluminium nitride with at least one oxide of a transition metal selected from those belonging to groups IVB, VB and VIB of the Periodic Chart of the Elements; and (b) allowing the thus obtained mixture to react at a temperature higher than 1450° C., preferably higher than or equal to 1500° C., and under a pressure higher than or equal to 10 MPa.

According to a preferred embodiment of the process of the present invention, in step (a) the aluminium nitride is mixed with an oxide of a transition metal or optionally with two or three oxides.

Ratios by weight among the oxides change according to the characteristics which in the finished product are desired to be exalted.

Both the aluminium nitride and metal oxides are used in the form of powders having granulometry lower than 5 micrometers, generally between 0.5 and 2 micrometers, and with AlN/oxides ratios such to obtain, in the final ceramic composite, the previously described contents of oxide component and nitride component. Molar ratios AlN/total oxides higher than or equal to 4/3, preferably between 4/3 and 2/1, are those which can be used.

The mixing of powders can be performed either in dry or in wet states according to techniques well known to those skilled in the art.

If the mixture is carried out in wet, state as dispersing agent organic liquids can be used, such as acetone, alcohols, aliphatic hydrocarbons containing a low number of carbon atoms, such as hexane, etc.

It is also possible to use optional binding agents able to solubilize or disperse in the liquid base and to degrade during the reaction/sintering step.

Examples of binding agents are those used for ceramic powders, such as polyvinylbutyral.

The mixture, after evaporation of the solvent, can be directly introduced into the sintering die as powder or as pre-shaped body.

Alternatively, for objects having a complicated shape or wide sizes, the mixture can be pre-stiffed according to the different techniques used for forming ceramic materials and then sintered, after having removed the organic components, under inert gas pressure (Hot isostatic press).

The shaped article is sintered according to the step (b), at a temperature preferably comprised between 1450° and 1950° C., or in an atmosphere controlled by inert gases, such as nitrogen, argon, etc., at high pressure, preferably comprised between 15 and 300 MPa, or under vacuum and with a mechanical pressure preferably comprised between 10 and 50 MPa.

Sintering times are higher than 30 minutes and are generally comprised between 45 and 120 minutes.

Powders, which make up the reaction mixture, have a purity degree generally higher than 96% and are easily available on the market.

To better understand the present invention and to practically perform it, some illustrative but not limitative examples are given hereinafter.

EXAMPLE 1

A mixture consisting of 57.15% molar AlN and 42.85% molar $TiO_2$, both components having purities higher than 99.5% and average granulometry equal to 1.5 micrometers, is prepared by wet milling in acetone using $Al_2O_3$ marbles and polyethylene jar. After having evaporated the solvent under reduced pressure, the powder is stiffed in a graphite die, coated with boron nitride powder, by an uniaxial compression equal to 6 MPa. By mechanical pressing of 20 MPa and under vacuum at 1550° C. for 60 minutes, a composite is obtained having a density of 4.35 g/cm$^3$, with a 95.4% densification, and electroconductive, with a resistivity of 360 microohm.cm.

The bending stress resistance at 4 points is 436 MPa and the Vickers microhardness is 1963 kg/mm$^2$.

Crystalline phases in the thus obtained composite are identified by X ray diffraction which shows only the presence of alpha-$Al_2O_3$ and TiN as illustrated in FIG. 1

EXAMPLE 2

A mixture consisting of 57.15% molar AlN, 31.07% molar $TiO_2$ and 11.78% molar $ZrO_2$, the three components having all purity degrees higher than 99.5% and average granulometries of about 1.5 micrometers, is prepared by wet milling in acetone, using $Al_2O_3$ marbles and polyethylene jar. After having evaporated the solvent under reduced pressure, the powder is pressed in a graphite die by an uniaxial compression of 6 MPa. By mechanical pressing at 40 MPa and under vacuum, at 1550° C. for 1 hour, an electroconductive composite is obtained having a density equal to 4.34 g/cm$^3$.

Figure 2:
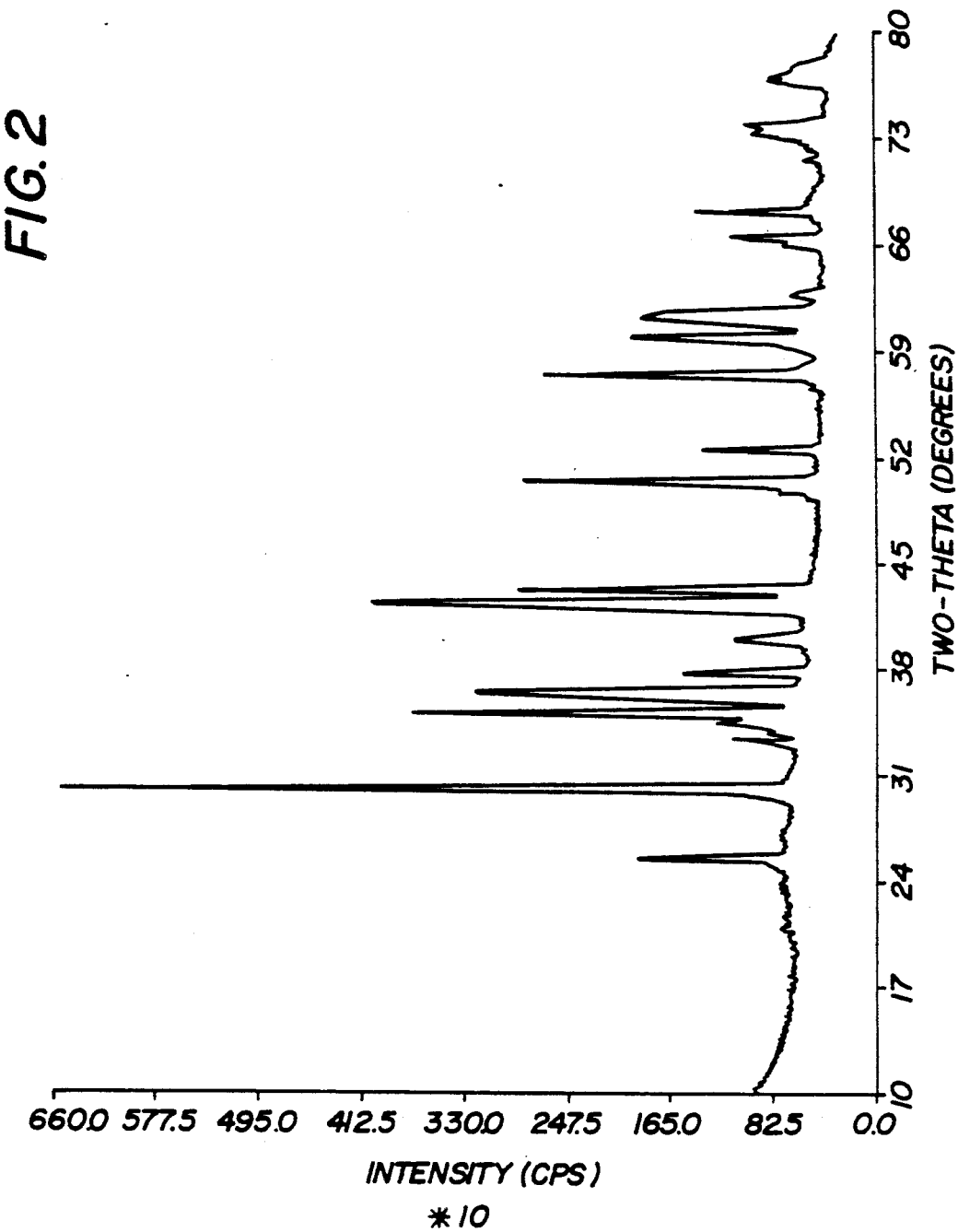

The bending stress resistance at 4 points is 341 MPa; the Vickers microhardness is 1260 kg/mm$^2$. Crystalline phases in the thus obtained composite are identified by X ray diffraction as illustrated by the diagram of FIG. 2.

EXAMPLE 3

A mixture consisting of 57.15% molar AlN and 42.85% molar $ZrO_2$, both having a purity degree higher than 99% and an average granulometry of about 2 micrometers, is prepared by wet milling in acetone using $Al_2O_3$ marbles and polyethylene jar. After having evaporated the solvent under reduced pressure, the powder is pressed in a graphite die by an uniaxial compression at 6 MPa.

Figure 3:
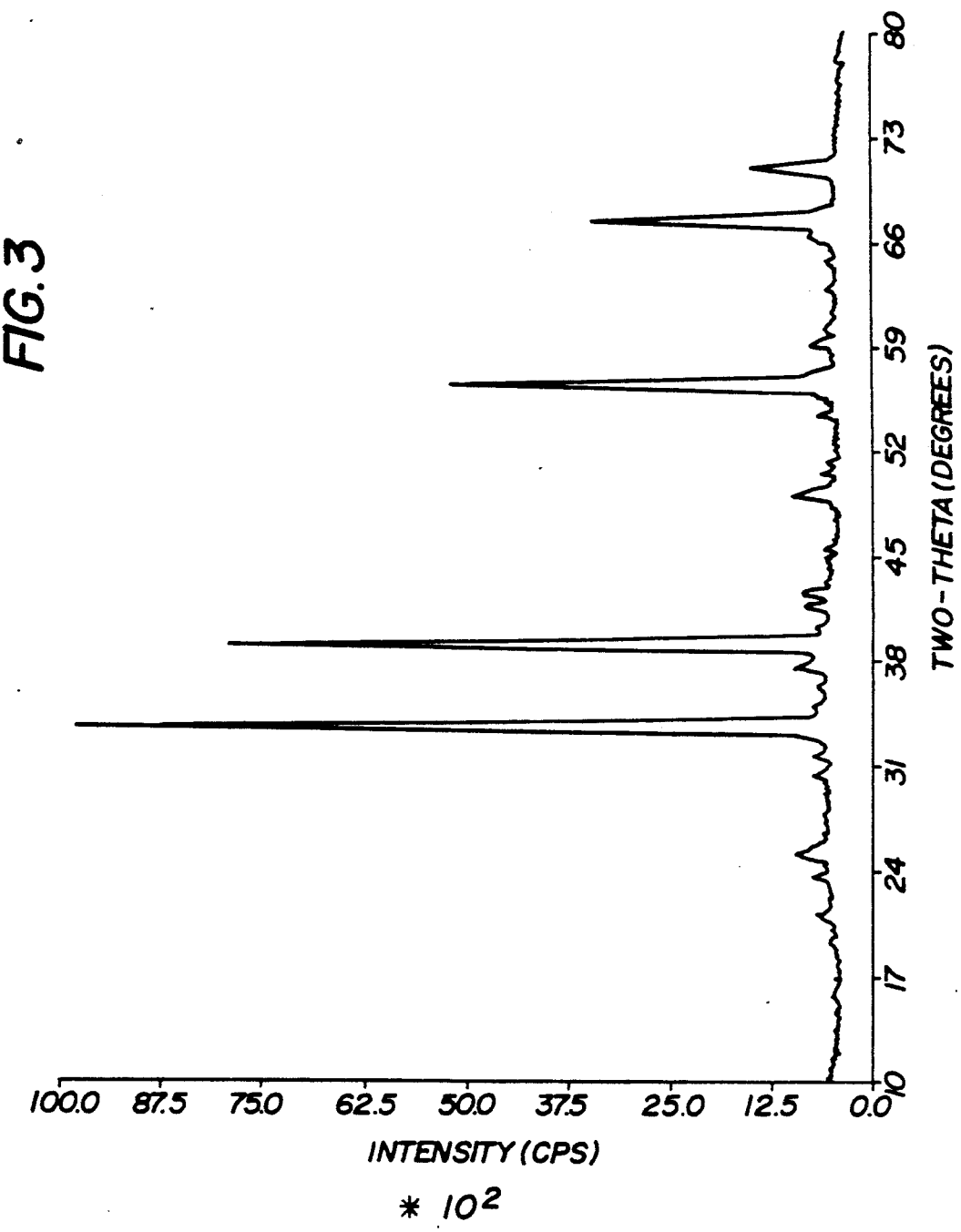

By mechanical pressing at 40 MPa and under vacuum at 1700° C. for 1 hour, a composite is obtained having a density of 4.88 g/cm$^3$; the electric resistivity is 590 microohm.cm and the Vickers microhardness is 1530 kg/mm$^2$. In the obtained product, both the oxide component and the nitride component are intimately mixed to give only one oxinitride crystalline phase of the cubic type, as shown by the X-ray diffraction diagram of FIG. 3.

EXAMPLE 4

A mixture consisting of 57.15% molar AlN, 35.41% molar $TiO_2$ and 7.44% molar $Nb_2O_5$, all the three components having purity degrees higher than 99% and granulometries of about 1.5 micrometers, is prepared as described in the preceding examples and is pressed under vacuum at the pressure of 40 MPa, at the temperature of 1550° C. for 1 hour.

Figure 4:
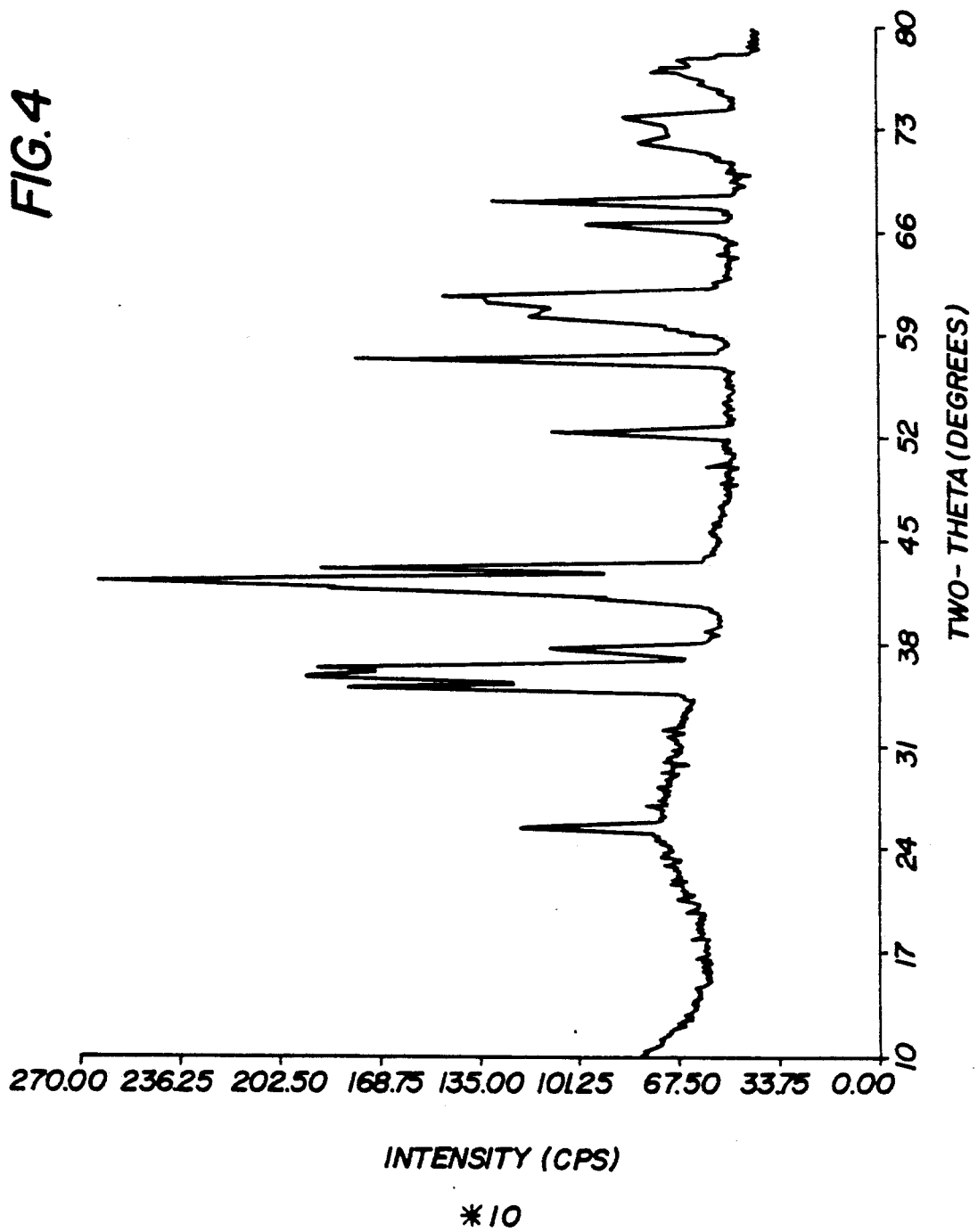

A composite is obtained having a density of 4.66 g/cm$^3$, electric resistivity of 574 microohm.cm and Vickers microhardness of 1420 kg/mm$^2$, said composite consisting of alpha-$Al_2O_3$ and of a mixture of nitride phases of the cubic type as shown by the X-ray diffraction diagram of FIG. 4.

We claim:

1. Refractory electroconductive ceramic compositions obtained by reactive sintering of aluminum nitride with at least one oxide of a transition metal, selected from the elements belonging to groups IVB, VB, and VIB of the Periodic Chart of the Elements, at a temperature higher than 1450° C. and a pressure higher than or equal to 10 MPa, wherein a portion of the aluminum nitride is converted to alumina and a portion of the at least one oxide is converted into a nitride.

2. Compositions according to claim 1, consisting essentially of oxidic components, represented by alumina, and of a nitride component, represented by at least one nitride of at least one transition metal of groups IVB, VB and VIB of the Periodic Chart of the Elements.

3. Compositions according to claim 1, wherein the oxide component is present in quantities between 20 and 80% by weight and the nitride component is present in quantities between 80 and 20% by weight.

4. Compositions according to claim 1, wherein the nitride component contains one, two or three nitrides of one, two or three transition metals.

5. Compositions according to claim 1, wherein the transition metals are selected from the group consisting of titanium, zirconium, hafnium, vanadium, niobium tantalum and mixtures thereof.

6. Compositions according to claim 5, wherein the transition metal is titanium.

7. Compositions according to claim 1 having melting temperatures equal to or higher than 2000° C., densities higher than or equal to 4 g/cm$^3$, densifications higher than 90%, ultimate tensile strengths, according to U.S. Military Standard 1942 (MR), higher than 250 MPa, Vickers microhardness, according to ASTM E-384, higher than 1000 kg/mm$^2$ and electric resistivities, according to F-43, lower than 600 microohm.cm.

8. Compositions according to claim 7 having density between 4 and 10 g/cm$^3$, densification between 95 and 99.9%, ultimate tensile strength between 300 and 600 MPa, Vickers microhardness between 1200 and 2500 kg/mm$^2$, electric resistivity between 400 and 100 microohm.cm.

9. A process for the preparation of an electroconductive refractory ceramic composition comprising the steps of:

(a) mixing aluminum nitride with at least one oxide of a transition metal selected from the elements belonging to groups IVB, VB, and VIB or the Periodic Chart of the Elements; and (b) allowing the mixture thus obtained to react at a sintering temperature higher than 1450° C., and at a pressure higher than or equal to 10 MPa wherein a portion of the aluminum nitride is converted to alumina and a portion of the at least one oxide is converted into a nitride.

10. Process according to claim 9, wherein the aluminium nitride and the metal oxides are used in form of powders having granulometries lower than 5 micrometers.

11. Process according to claim 9, wherein the molar ratios AlN/total oxides are higher than or equal to 4/3.

12. Process according to claim 9, wherein the mixing is carried out in a dry or wet state.

13. Process according to claim 9, wherein the sintering of step (b) is carried out between 1450° and 1950° C. under atmosphere controlled by inert gases at a high pressure of between 15 and 300 MPa.

14. Process according to claim 9, wherein the sintering of step (b) is carried out under vacuum and with a mechanical pressure comprised between 10 and 50 MPA.

15. Process according to claim 9, wherein sintering times are higher than 30 minutes.

16. Process according to claim 9, wherein reagents are used with a purity degree higher than 96%.

17. The process of claim 9 wherein the mixture reacts at temperatures higher than or equal to 1500° C.

18. The process of claim 10 wherein the oxide of the transition metal comprises a mixture of two or more transition metal oxides.

19. The process of claim 18 wherein there are three transition metal oxides present.

20. The process of claim 10 wherein the powders have granulometries between 0.5 and 2 micrometers.

21. The process of claim 15 wherein the sintering time is in the range of between 45 and 120 minutes.

* * * * *